United States Patent [19]

Yoshida et al.

[11] Patent Number: 5,398,564
[45] Date of Patent: Mar. 21, 1995

[54] TORQUE TRANSMISSION UNIT OF MOTOR

[75] Inventors: Teruyuki Yoshida; Norio Umezawa, both of Takefu, Japan

[73] Assignee: Matsushita Electric Industrial Co., Ltd., Osaka, Japan

[21] Appl. No.: 84,965

[22] Filed: Jul. 2, 1993

[30] Foreign Application Priority Data

Jul. 13, 1992 [JP] Japan .................. 4-184940

[51] Int. Cl.$^6$ .......................... F16H 1/16; F16D 3/78
[52] U.S. Cl. ............................... 74/425; 464/73; 464/92
[58] Field of Search ............... 74/89.14, 425; 464/73, 464/92

[56] References Cited

U.S. PATENT DOCUMENTS 4,643,040  2/1987  Adam et al. ................. 74/425
4,899,608  2/1990  Knappe et al. ............... 74/425 X
5,259,261  11/1993 Michel ........................... 74/425

FOREIGN PATENT DOCUMENTS 62-82457  5/1987  Japan .
4-51056   4/1992  Japan .

Primary Examiner—Allan D. Herrmann
Attorney, Agent, or Firm—Stevens, Davis, Miller & Mosher

[57] ABSTRACT

A torque transmission unit comprises a worm wheel engaged with a worm of an armature of a motor, a gear casing housing therein the worm wheel, and an output disk operationally engaged at one end face thereof with the worm wheel through a damper. The output disk is provided on the one end face thereof with a hollow projection integrated with the output disk. The projection extends through an opening of the gear casing, from which a torque of the motor is taken out.

11 Claims, 5 Drawing Sheets ns unit of motor

FIELD OF THE INVENTION AND RELATED ART STATEMENT

The present invention relates to a torque transmission unit of a motor incorporating a worm.

In the torque transmission unit, in general, a torque generated in an armature of a motor is taken out through a worm, a worm wheel, a damper, a torque transmission disk and an output shaft.

As described above, such a torque transmission unit incorporates therein many parts or elements. Therefore, it is hard to reduce the cost thereof and the weight thereof.

OBJECT AND SUMMARY OF THE INVENTION

An object of the present invention is to provide a torque transmission unit with a reduced cost and a light weight.

To this end, according to the present invention, there is provided a torque transmission unit of a motor comprising a worm wheel capable of engaging with a worm provided on an armature shaft of the motor; a gear casing housing therein the worm wheel, the gear casing being provided therein with an opening; and an output disk engaged at one end face thereof with the worm wheel, the output disk being provided on the one end face thereof with a projection integrated with the output disk, which projection extends through the opening of the gear casing.

DETAILED DESCRIPTION OF PREFERRED EMBODIMENTS

Figure 1:
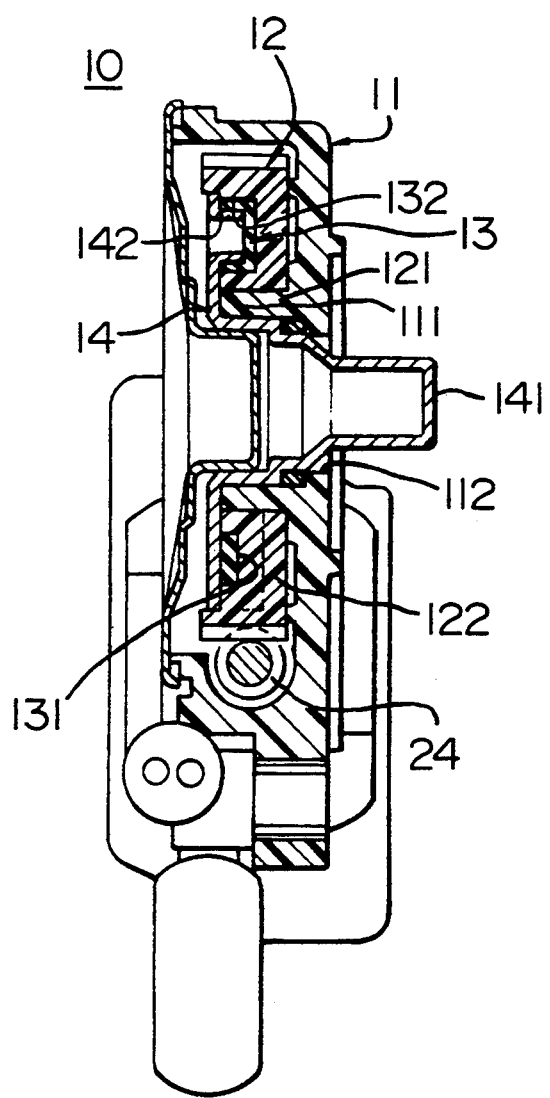
FIG. 1 is a sectional view taken along the lines I—I in FIG. 2, showing a torque transmission unit according to an embodiment of the present invention.
Figure 2:
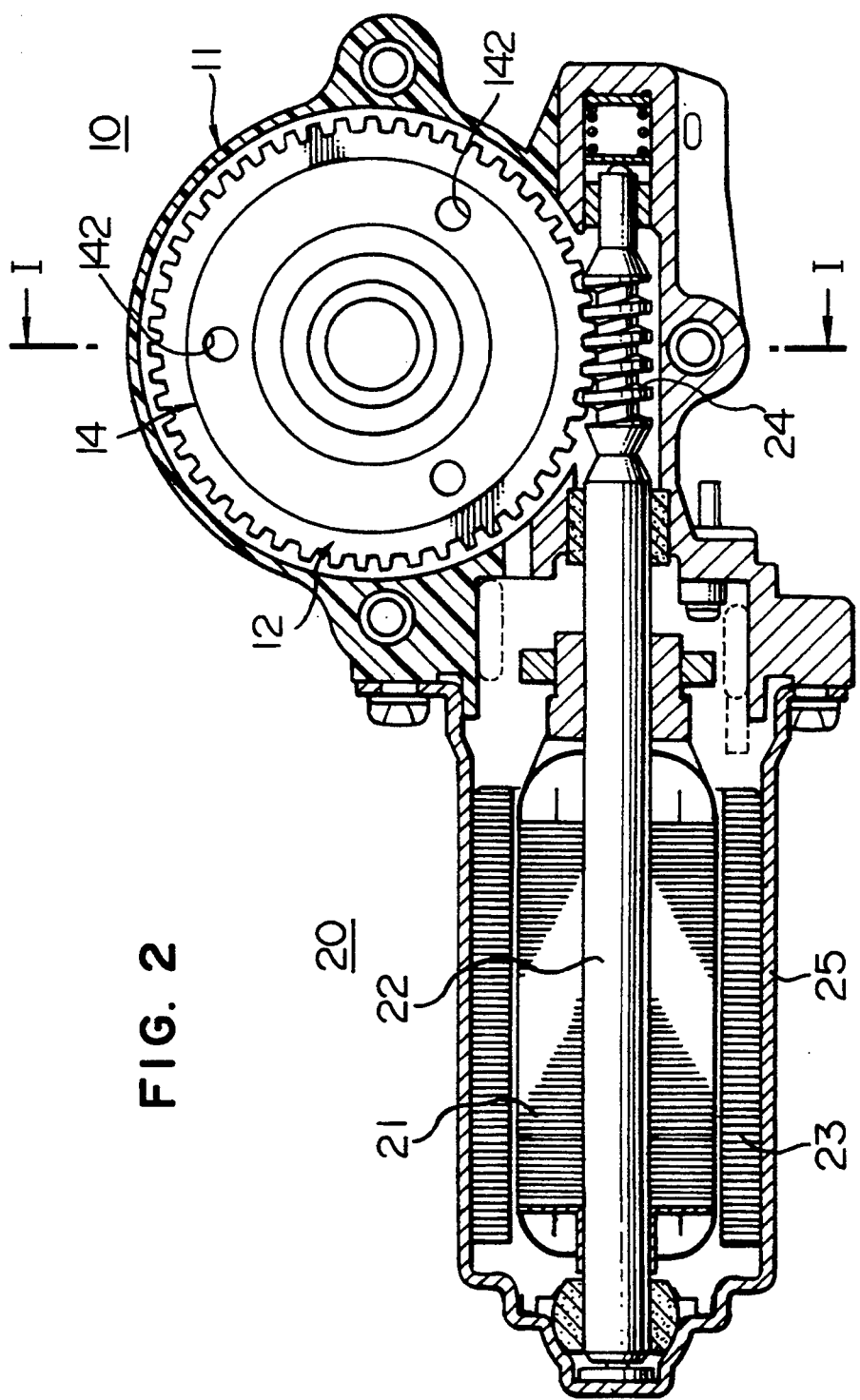
FIG. 2 is a longitudinal sectional view showing the torque transmission shown in FIG. 1.

Referring to FIGS. 1 and 2, a torque transmission unit 10 is mounted onto a motor 20. The motor 20 comprises an armature 21 provided on one end portion of an armature shaft 22, and a stator 23 surrounding the armature 21. The other end portion of the armature shaft 22 is formed with a worm 24.

The torque transmission unit 10 comprises a gear casing 11 with an annular central boss 111, attached to a motor housing 25, and a worm wheel 12 with a central opening 121.

The worm wheel 12 is meshed with the worm 24 of the armature shaft 22 and is rotatably supported at the central opening 121 by the boss 111 of the gear casing 11. The worm wheel 12 is provided at an inner end face with a plurality of radial ribs 122.

Figure 3:
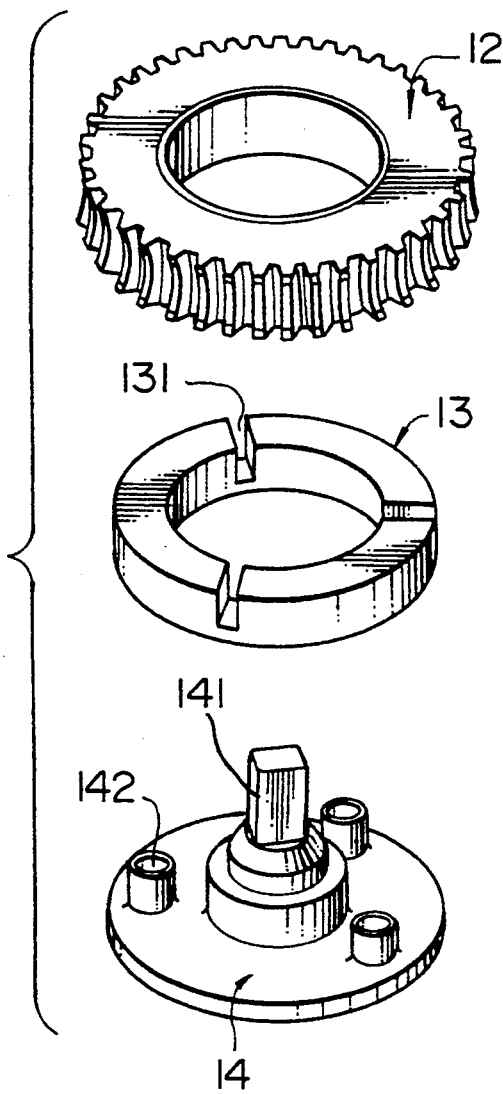
FIGS. 3 and 4 are exploded views showing a transmission mechanism shown in FIG. 1.
Figure 4:
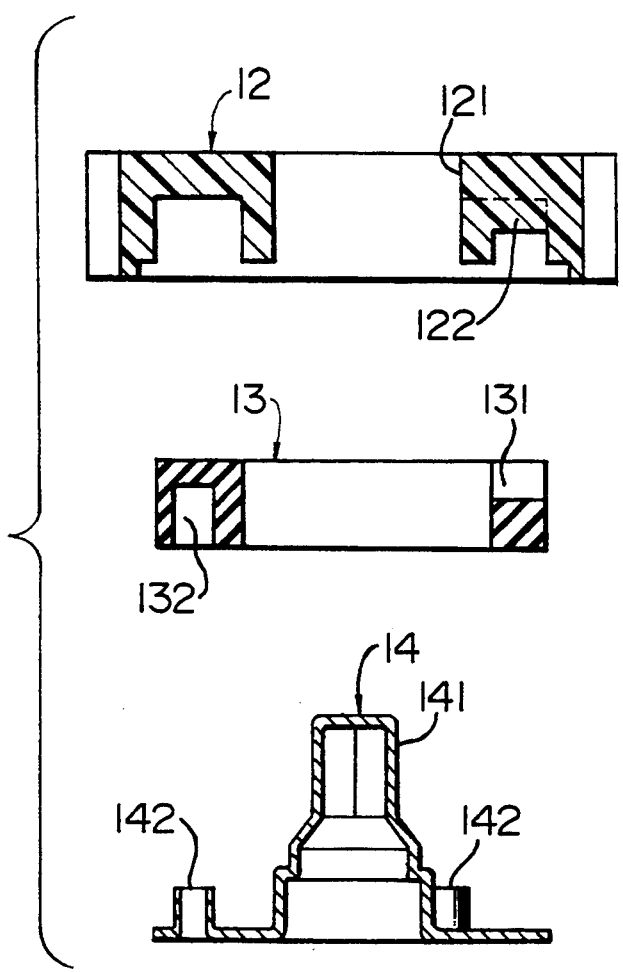

As shown in FIGS. 3 and 4, a ring damper 13 is provided at one end face thereof with radial grooves 131 and at the other end face thereof with a plurality of recesses 132 which are coaxially disposed and angularly spaced from one another. The radial grooves 131 are so located as to be engaged with the radial ribs 122 of the worm wheel 12. Therefore, the worm wheel 12 can house therein the ring damper 13.

The torque transmission unit 10 further comprises an output disk 14 which is made by drawing. The disk 14 is provided at a centre portion thereof with a hollow quadratic prism projection 141 and at a periphery thereof with a plurality of hollow cylindrical projections 142 which are coaxially disposed and angularly spaced from one another. As shown in FIG. 4, the quadratic prism projection 141 has a closed end. The quadratic prism projection 141 and the cylindrical projections 142 are integral with the disk 14. The disk 14 is coupled with the ring damper 13 with the projections 142 received in the recesses 132 of the ring damper 13. The projection 141 is projected out from an opening 112 of the gear casing 11 when assembled.

The output disk 14 may alternatively be made by die casting or moulding. The projection 142 is not limited to be hollow cylindrical. It is possible to integrally provide non-cylindrical hollow projections to the output disk 14. Further, the projection 142 can be provided by cutting and bending a part of the disk 14.

Next, an operation of the torque transmission unit 10 described above will be explained hereinafter.

The torque from the worm 24 through the worm wheel 12 is transmitted to the damper 13 through a rib-groove engagement. The torque is further transmitted from the damper 13 to the output disk 14 trough a projection-recess engagement. The torque is taken out from a part of the quadratic prism projection 141 of the disk 14 exposed outside of the gear casing 11.

Figure 6:
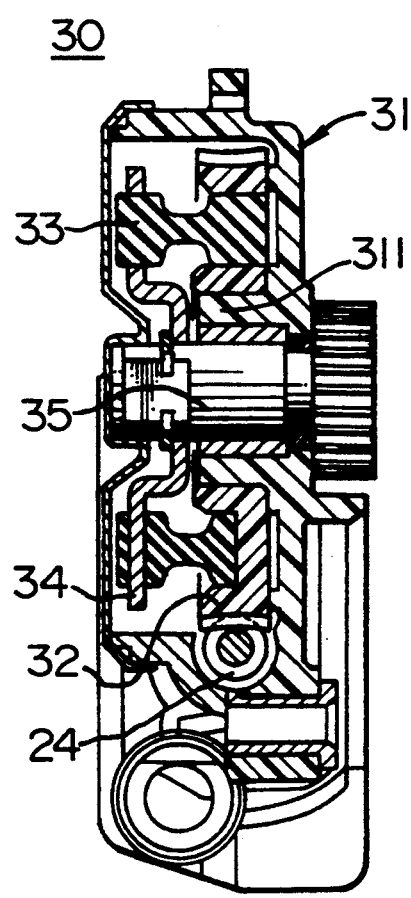
FIG. 6 is a sectional view showing a prior art unit.

According to the conventional transmission unit 30, as shown in FIG. 6, a gear casing 31 with an annular central boss 311 houses therein a worm wheel 32 engaged with a worm 24 of an armature shaft of a motor, a transmission disk 34, and a damper 33 connecting the worm wheel 32 with the transmission disk 34. An output shaft 35 driven by the transmission disk 34 extends to be exposed outside of the gear casing 31. As described above, a torque is taken out through the worm wheel 32, the damper 33, the transmission disk 34 and the output shaft 35.

To the contrary, according to the present invention, the transmission disk and the output shaft are integrated into a one piece output disk 14, thereby reducing the number of parts or elements and then the cost of the unit. Further, since the projections 141 and 142 can be made to be hollow, it is possible to reduce a weight of the unit.

Figure 5:
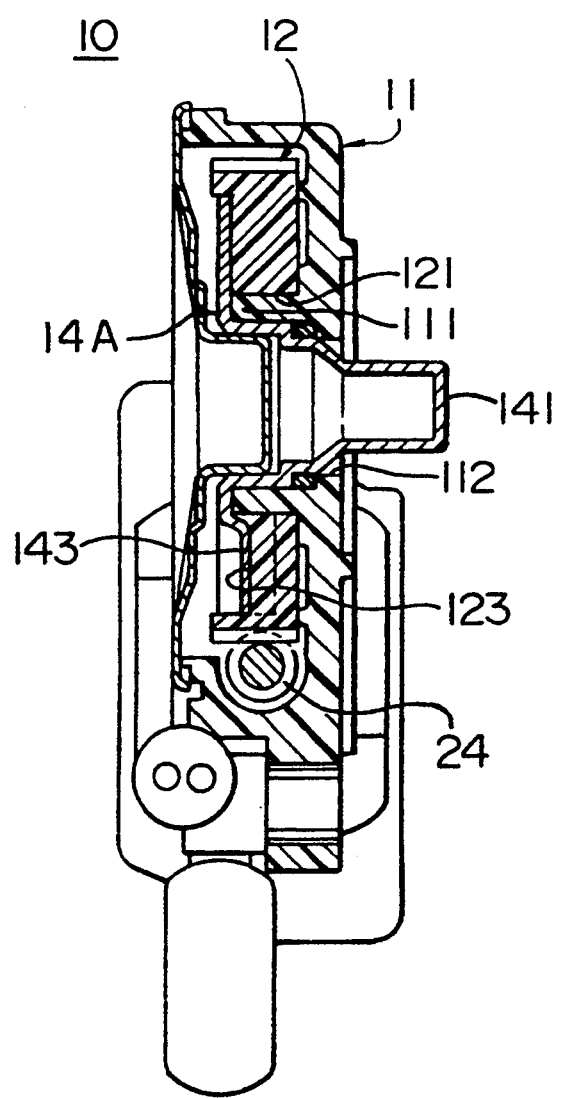
FIG. 5 is a sectional view showing a torque transmission unit according to another embodiment of the present invention.

In another embodiment of the present invention, as shown in FIG. 5, the output disk 14A is provided at an end face thereof opposing to the worm wheel 12 with a plurality of radial land portions 143, instead of cylindrical projections 142. The worm wheel 12 is provided with a plurality of radial grooves 123, instead of the radial ribs 122. The radial land portions 143 are so positioned as to correspond to the grooves 123 of the worm wheel 12. According this, it can be possible to omit the damper 13 from the torque transmission unit 10, thereby further reducing the number of parts and the weight thereof.

What is claimed is:

1. A torque transmission unit of a motor comprising:
    a worm wheel for engaging with a worm provided on a shaft of the motor;
    a gear casing housing said worm wheel, said gear casing being provided with an opening; and an output disk operatively engaged at one end face thereof with said worm wheel, said output disk being provided on said one end face thereof with a projection integrated with said output disk, said projection extending through said opening of said gear casing and beyond said worm wheel, and said projection having a closed end.

2. A unit according to claim 1, wherein said projection is hollow.

3. A unit according to claim 1, wherein said output disk is coupled directly with said worm wheel.

4. A unit according to claim 3, wherein said projection is hollow.

5. A unit according to claim 1, further comprising a damper interposed between said output disk and said worm wheel to couple said output disk with said worm wheel.

6. A unit according to claim 5, wherein said projection is hollow.

7. A unit according to claim 5, wherein:
said worm wheel comprises a plurality of radial ribs; and
said damper is provided with a plurality of radial grooves engaged with said plurality of radial ribs.

8. A unit according to claim 5, wherein said damper is provided with a recess which is engaged with said projection.

9. A unit according to claim 7, wherein said damper is provided with a recess which is engaged with said projection.

10. A unit according to claim 1, wherein:
said worm wheel is provided with a central opening; and
said projection passes through said central opening of said worm wheel.

11. A unit according to claim 1, wherein said shaft of said motor is an armature shaft.

* * * * *